DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 13, 1970

879 O.G. 365

T879,003

PROTECTIVE COATINGS FOR FOODS

Lou P. Johnson, % Tennessee Eastman Company, P.O. Box 511, Kingsport, Tenn. 37662, and Marion O. Brunson, 13212 Shaker Square, Cleveland, Ohio 44120

Continuation of application Ser. No. 663,482, Aug. 28, 1967. This application Jan. 21, 1970, Ser. No. 4,456

**Int. Cl. A23d *7/16***

U.S. Cl. 260—28.5

No Drawing. 8 Pages Specification

Emulsions of paraffin wax and certain partially oxidized polyethylenes when blended with an alkali soluble resin solution provide improved moisture barrier coating materials for the protection of fruits and vegetables.